United States Patent
Eguchi et al.

(10) Patent No.: US 10,473,556 B2
(45) Date of Patent: Nov. 12, 2019

(54) METHOD FOR GENERATING LOAD ESTIMATION MODEL IN TIRE UNIFORMITY TESTER

(71) Applicant: KOBE STEEL, LTD., Hyogo (JP)

(72) Inventors: Toru Eguchi, Hyogo (JP); Yoshiharu Nishida, Hyogo (JP); Yoshiaki Matsubara, Hyogo (JP); Yasuhiro Matsushita, Hyogo (JP)

(73) Assignee: Kobe Steel, Ltd., Hyogo (JP)

(*) Notice: Subject to any disclaimer, the term of this patent is extended or adjusted under 35 U.S.C. 154(b) by 307 days.

(21) Appl. No.: 15/510,445

(22) PCT Filed: Sep. 29, 2015

(86) PCT No.: PCT/JP2015/077608
§ 371 (c)(1),
(2) Date: Mar. 10, 2017

(87) PCT Pub. No.: WO2016/056432
PCT Pub. Date: Apr. 14, 2016

(65) Prior Publication Data
US 2017/0299471 A1 Oct. 19, 2017

(30) Foreign Application Priority Data
Oct. 9, 2014 (JP) .................. 2014-208108

(51) Int. Cl.
*G01M 17/02* (2006.01)
*B29D 30/00* (2006.01)
*G01M 1/28* (2006.01)

(52) U.S. Cl.
CPC ....... *G01M 17/022* (2013.01); *B29D 30/0061* (2013.01); *G01M 1/28* (2013.01); *B29D 2030/0066* (2013.01)

(58) Field of Classification Search
CPC .......... G01M 1/16; G01M 17/02; G01M 1/28; G01M 17/022; B29D 30/0061; B29D 2030/0635; B29D 2030/0066
See application file for complete search history.

(56) References Cited

U.S. PATENT DOCUMENTS 4,702,287 A * 10/1987 Higbie .................. B60S 5/046
  141/4
7,434,454 B2 * 10/2008 Matsumoto ......... G01M 17/022
  451/1

(Continued)

FOREIGN PATENT DOCUMENTS

JP   H06-317504 A   11/1991
JP   H06-95057 B2   11/1994

(Continued)

OTHER PUBLICATIONS

International Search Report (ISR) dated Dec. 8, 2015 from corresponding Appl No. PCT/JP2015/077608, with English translation, 5 pp.

(Continued)

*Primary Examiner* — Stephanie E Bloss
(74) *Attorney, Agent, or Firm* — Studebaker & Brackett PC

(57) ABSTRACT

In a tire uniformity testing apparatus which measures uniformity of a tire by measuring a load applied to the tire pressed against a rotary drum, a load estimation model is generated which is used to control a pressing position of the rotary drum, and generates a load estimation model indicating a relation between the pressing position of the tire with respect to the rotary drum and the load applied to the tire. The load estimation model is generated by: holding the tire in which uniformity has already been measured for each characteristic value; acquiring a nominal model depending (Continued)

on the characteristic value of the tire; and generating based on the acquired nominal model.

2 Claims, 9 Drawing Sheets

(56) References Cited

U.S. PATENT DOCUMENTS

| | | | |
|---|---|---|---|
| 2001/0007208 A1* | 7/2001 | Colarelli, III | G01M 1/225 73/462 |
| 2007/0100576 A1* | 5/2007 | Obunai | G01M 17/02 702/145 |
| 2009/0293603 A1* | 12/2009 | Douglas | G01B 21/12 73/146 |
| 2011/0113875 A1* | 5/2011 | Okada | G01M 17/022 73/146 |
| 2014/0000363 A1* | 1/2014 | Clasquin | G01M 17/02 73/462 |
| 2014/0230535 A1* | 8/2014 | Okada | G01M 17/022 73/146 |
| 2017/0153163 A1* | 6/2017 | Okada | G01M 17/022 |
| 2017/0241868 A1* | 8/2017 | Mawby | G01M 17/02 |
| 2017/0241869 A1* | 8/2017 | Mawby | G01M 17/02 |

FOREIGN PATENT DOCUMENTS

| | | | |
|---|---|---|---|
| JP | 2001-194271 A | | 7/2001 |
| JP | 2006-105775 A | | 4/2006 |
| JP | 2013-124858 | * | 6/2013 |
| JP | 2013-124858 A | | 6/2013 |

OTHER PUBLICATIONS

Written Opinion dated Dec. 8, 2015 from corresponding Appl No. PCT/JP2015/077608, with English translation, 9 pp.

* cited by examiner

METHOD FOR GENERATING LOAD ESTIMATION MODEL IN TIRE UNIFORMITY TESTER

TECHNICAL FIELD

The present invention relates to a method for generating a load estimation model which expresses a relation between a pressing position of a rotary drum against a tire and a tire load generated in the tire in a tire uniformity testing apparatus.

BACKGROUND ART

Conventionally, a tire test for determining good or bad by measuring tire uniformity (uniformity of tire) and the like has been performed on tires as finished products. For example, in the case of performing a tire test on a tire for a passenger car, the tire uniformity is measured by the following procedure using a test apparatus as illustrated in Patent Reference 1 and the like.

That is, in the tire testing apparatus of Patent Reference 1, the tire flowing from the upstream of an inspection line is sandwiched by divided upper and lower rims, and the tire is inflated in a short time and fixed between the upper and lower rims. After that, by setting the internal pressure of the tire to a test pressure, the rotary drum is pressed against the tire held at the test pressure and is rotated normally or reversely to measure the tire uniformity.

When measuring the tire uniformity in this way, it is necessary to accurately grasp a relation between the pressing position of the rotary drum and the tire load (pressing load) generated at the pressing position, and to correctly generate the target pressing load (that is, a target tire load) on the tire. For this purpose, the tire testing apparatus is controlled using the relation existing between the pressing position of the rotary drum and the generated tire load to measure the tire uniformity.

For example, in Patent Reference 2, a tire testing apparatus is controlled, using a spring constant when assuming that a pressing position of a rotary drum and a tire load generated at the pressing position linearly change. That is, Patent Reference 2 discloses a method for measuring the relation between the pressing position and the generated tire load in advance, calculating the spring constant from the measured value, and controlling the tire load (pressing load) assuming that the calculated spring constant is constant.

CITATION LIST

Patent Reference

Patent Reference 1: JP-B-H06-95057
Patent Reference 2: JP-A-2013-124858

SUMMARY OF THE INVENTION

Problems that the Invention is to Solve

Incidentally, in order to accurately measure the tire uniformity, it is necessary to press the rotary drum so as to set a predetermined target pressing load for each type of tire. Therefore, the pressing load setting method disclosed in Patent Reference 2 is configured to calculate the tire load from the pressing position of the rotary drum against the tire on the assumption that the spring constant is constant. In other words, according to Patent Reference 2, as a method for acquiring the target pressing load, a tire load under measurement is acquired based on the spring constant calculated from the displacement of the pressing position measured until the target pressing load is attained and the change amount of the feedback value of the pressing load to control the pressing position of the tire.

However, since the spring constant (referred to as a true spring constant) of the tire under measurement tends to fluctuate under the influence of the disturbance component, the spring constant acquired by the calculation does not necessarily coincide with the true spring constant, and there is a possibility of including an error with respect to the true spring constant. Therefore, according to the method disclosed in Patent Reference 2, since an inaccurate spring constant including such an error is used, it is difficult to accurately add the tire load necessary for measuring the tire uniformity to the tire.

Further, according to Patent Reference 2, only the pressing position of the rotary drum is considered as a factor influencing the spring constant. In fact, however, as a factor influencing the spring constant, not only the pressing position of the rotary drum but also the pressure of the air flowing into the tire and the like should be taken into consideration. Therefore, even if the air pressure in the tire deviates from a predetermined pressure (test pressure), it is difficult to accurately acquire the spring constant, and it is difficult to accurately add the tire load necessary for measuring the tire uniformity to the tire.

Furthermore, when the spring constant acquired by the calculation does not coincide with the true spring constant for the above reason, it is necessary to repeat recalculation of the spring constant in order to acquire a pressing position for achieving a necessary tire load. Since the repetition of the recalculation extends the measurement time of the tire uniformity, as a result, the productivity of the inspection line including the tire test is lowered.

The present invention has been made in view of the above-mentioned problems, and an object of the present invention is to provide a method for generating a load model in a tire uniformity testing apparatus capable of generating a load model in which a tire load necessary for measuring the tire uniformity can be acquired accurately and in a short time.

Means for Solving the Problems

In order to solve the above problem, a method for generating a load estimation model in the tire uniformity testing apparatus of the present invention takes the following technical means.

That is, the method for generating a load estimation model in the tire uniformity testing apparatus of the present invention is a method for generating a load estimation model which is used to control a pressing position of a rotary drum, and generates a load estimation model indicating a relation between a pressing position of a tire with respect to the rotary drum and a load applied to the tire, in a tire uniformity testing apparatus which measures uniformity of the tire by measuring the load applied to the tire pressed against the rotary drum, the method including holding information acquired by the measurement for each characteristic value of the tire, with respect to the tire in which uniformity has already been measured by the tire uniformity testing apparatus; acquiring a nominal model used for generating the load estimation model from the information held in the holding, in accordance with the characteristic value of the tire; and generating a load estimation model which indicates a relation between the pressing position of the tire and the load applied to the tire, on the basis of the acquired nominal model.

Here, the acquiring may acquire the nominal model, in accordance with a characteristic value of another tire having the highest similarity with the tire.

Further, another method for generating a load estimation model in the tire uniformity testing apparatus of the present invention is a method for generating a load estimation model which is used to control a pressing position of a rotary drum, and generates a load estimation model indicating a relation between a pressing position of a tire with respect to the rotary drum and a load applied to the tire, in a tire uniformity testing apparatus which measures uniformity of the tire by measuring the load applied to the tire pressed against the rotary drum, the method including: holding information acquired by the measurement for each characteristic value of the tire, with respect to the tire in which uniformity has already been measured by the tire uniformity testing apparatus; acquiring a nominal model used for generating the load estimation model from the information held in the holding, in accordance with the characteristic value of the tire on the basis of the characteristic value of the tire; and generating a load estimation model which indicates a relation between the pressing position of the tire and the load applied to the tire, on the basis of the acquired nominal model.

Advantages of the Invention

According to the method for generating a load estimation model in the tire uniformity testing apparatus of the present invention, it is possible to generate a load estimation model in which the tire load necessary for measuring the tire uniformity can be acquired accurately and in a short time.

MODES FOR CARRYING OUT THE INVENTION

Figure 1:
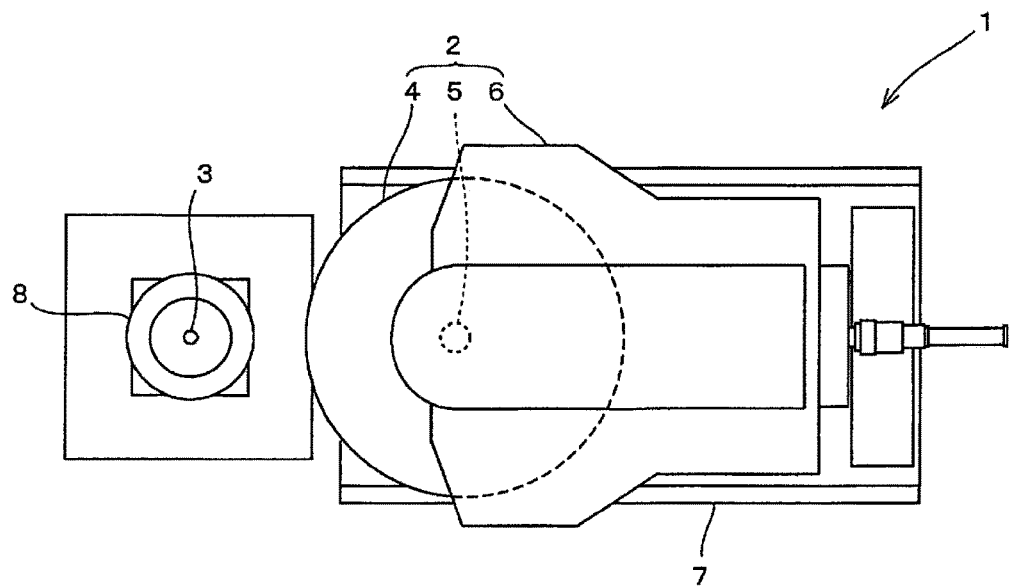
FIG. 1 is a plan view illustrating a schematic configuration of a tire uniformity testing apparatus according to a first embodiment of the present invention.

Hereinafter, embodiments of the present invention will be described with reference to the drawings. It should be noted that the same constituent members common to the embodiments described below are denoted by the same reference numerals and the same names. Therefore, the same description will not be repeated for constituent members denoted by the same reference numerals and same names.

First Embodiment

Hereinafter, a first embodiment of the present invention will be described with reference to the drawings.

In the present embodiment, a method for generating a "load estimation model" used in a tire uniformity testing apparatus 1 illustrated in FIGS. 1 and 2 will be described.

First, prior to the description of the method for generating the load estimation model, the configuration of the tire uniformity testing apparatus 1 that controls the pressing position of the rotary drum using the load estimation model generated by this generating method will be described.

Figure 2:
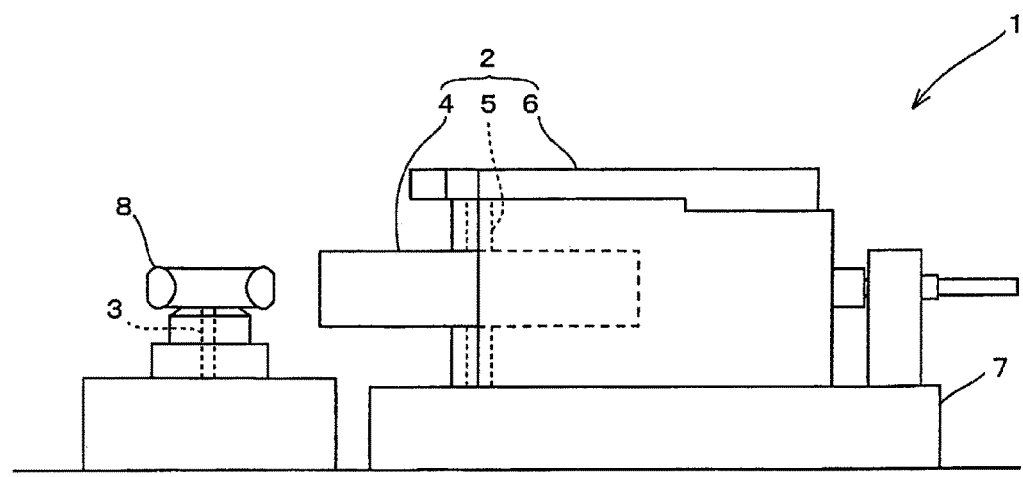
FIG. 2 is a front view illustrating a schematic configuration of the tire uniformity testing apparatus according to the first embodiment.

FIG. 1 is a plan view illustrating a schematic configuration of the tire uniformity testing apparatus 1. FIG. 2 is a front view illustrating a schematic configuration of the tire uniformity testing apparatus. With reference to FIGS. 1 and 2, the tire uniformity testing apparatus 1 according to the present embodiment evaluates the tire uniformity (or simply, uniformity), which is homogeneity or uniformity of the product tire 8, for example, radial force variation (RFV) generated in the tire 8, as a product inspection.

Specifically, the tire uniformity testing apparatus 1 (hereinafter referred to as the tire testing apparatus 1) includes a rotary drum 2 which is a cylindrical rotating body provided so that an axis thereof faces upward and downward, and a tire shaft 3 which is a shaft provided to be parallel to the axis of the rotary drum 2 and is freely rotatable around its own axis.

The rotary drum 2 has a cylindrical drum member 4 having a tire testing simulated road surface formed on its outer peripheral surface, a rotary shaft 5 which rotatably supports the cylindrical drum member 4 at the axial center position, and a frame member 6 which supports the rotary shaft 5. The drum member 4 has a shape in which a dimension in a vertical direction (a direction perpendicular to a radial direction) is shorter than a length in a radial direction (e.g., a diameter), and when the length along the axial direction of the cylindrical member is defined as a measure, the drum member 4 is formed into a short cylindrical shape with a large diameter. At the center (the axial center or the center) of the drum member 4, a rotary shaft 5 that rotatably supports the drum member 4 is provided. The frame member 6 has a pair of upper and lower support frames provided so as to protrude in the horizontal direction along the radial direction of the drum member 4, and the rotary shaft 5 can be supported between the pair of upper and lower support frames so as to bridge the vertical direction.

Between the rotary shaft 5 and the frame member 6, a load measuring unit (not illustrated) is provided to be capable of measuring a load or a moment generated on the rotary shaft 5 when the rotary drum 2 is pressed against the tire 8. The frame member 6 (support frame) supports the rotary shaft 5 via the load measuring unit. The load measuring unit according to the present embodiment is attached to the rotary shaft 5 side of the rotary drum 2, but the load measuring unit can also be attached to the side of the tire shaft 3 described later to measure the load generated on the tire shaft 3.

Further, on the lower side of the frame member 6, there is provided drum moving unit 7 capable of horizontally moving the rotary drum 2 with respect to a foundation on which the tire testing apparatus 1 is installed. By using the drum moving unit 7, the rotary drum 2 can approach and separate from the tire shaft 3. By bringing the rotary drum 2 close to the tire shaft 3 by the horizontal movement of the drum moving unit 7 as described above, the rotary drum 2 is pressed against the tire 8 held at the test pressure.

At this time, the rotary drum 2 is pressed against the tire 8 by adjusting the position of the rotary drum 2 with respect to the tire 8. As the rotary drum 2 comes closer to the tire 8, the rotary drum 2 is strongly pressed against the tire 8. At this time, the load applied (generated) to the tire 8 by the pressing of the rotary drum 2 is referred to as a pressing load.

In the rotary drum 2, the position (pressing position) with respect to the tire 8 is adjusted so that a target pressing load (target pressing load) is applied to the tire 8. In other words, if the conditions for the tire 8 such as type, size and air pressure are constant, the pressing load applied to the tire 8 correspond one-to-one to the pressing position of the rotary drum 2 which achieves the pressing load. Therefore, for a target pressing load, one objective pressing position (target pressing position) is determined.

The tire shaft 3 is a bar-like member provided along the vertical direction. On the lower end side of the tire shaft 3, rotation unit (not illustrated) for rotating the tire shaft 3 about the axis of the tire shaft 3 facing in the vertical direction is provided. Further, on the upper end side of the tire shaft 3, a rim member (not illustrated) capable of fixing the tire 8 as the measurement object of the tire uniformity is provided. The tire 8 can be fixed to the tire shaft 3 via the rim member.

Incidentally, when tire uniformity is measured using the tire testing apparatus 1, compressed air supplied from a factory air source is pressure-adjusted and then is supplied to the tire 8 attached to the tire shaft 3. By inflating the tire 8 with this compressed air, the tire 8 is fixed between the upper and lower rims and the inside of the tire 8 is held at the test pressure. Thereafter, by moving the rotary drum 2 to the target pressing position, the rotary drum 2 is pressed against the tire 8 held at the test pressure to apply the target pressing load. After the pressing or simultaneously with the pressing, the tire 8 is rotated in the normal rotation direction to measure the tire uniformity in the normal rotation direction. When the measurement in the normal rotation direction is completed, the tire 8 is reversely rotated and the tire uniformity in the reverse rotation direction is also measured.

In this way, it is possible to measure the pressing load applied to the tire 8 when the rotary drum 2 is pressed against the tire 8 and rotated, by the load measuring unit attached to the rotary shaft 5 of the rotary drum 2. The tire uniformity of the tire 8 can be evaluated from the variation of the pressing load measured by the load measuring unit.

Incidentally, the above-described tire uniformity is measured on the premise that the rotary drum 2 is accurately pressed against the tire 8 with the target pressing load. Therefore, it is extremely important to accurately apply the target pressing load to the tire 8 during the tire uniformity test for accurately measuring the tire uniformity.

Figure 3:
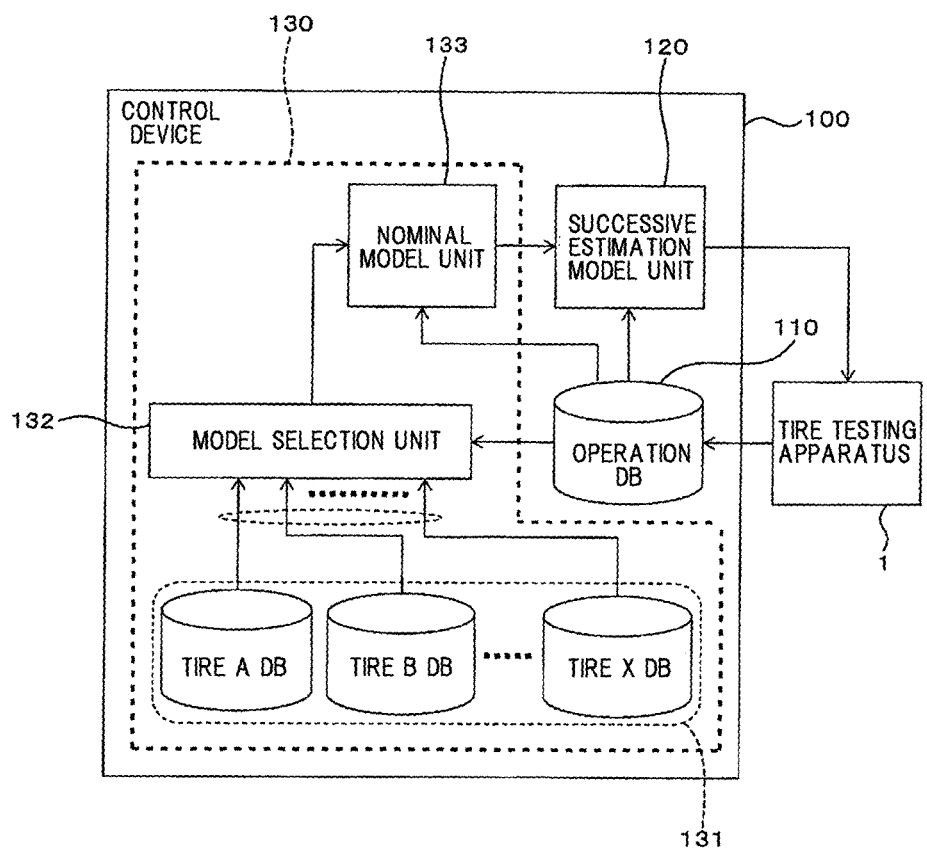
FIG. 3 is a block diagram illustrating a configuration of a control device connected to the tire uniformity testing apparatus according to the first embodiment to generate a load model.

Therefore, as illustrated in FIG. 3, the tire testing apparatus 1 is provided with a control device 100 for controlling the pressing position of the rotary drum 2 in order to accurately achieve the target pressing load.

FIG. 3 is a block diagram illustrating a configuration of a control device 100 connected to the tire testing apparatus 1 according to the present embodiment to generate a load model.

The control device 100 includes an operation DB 110 serving as a database which stores information on the tire 8 acquired as a result of the operation of the tire testing apparatus 1 as operation data, a successive estimation model unit 120 which estimates a pressing load to be applied to the tire 8, using a load estimation model to be described later and information of the tire 8 stored in the operation DB 110, and a load estimation model (nominal model) generating unit 130 which generates a load estimation model as a nominal model of the load model used in the successive estimation model unit 120.

The operation data stored in the operation DB 110 is information on the tire 8 which is attached to the tire testing apparatus 1 and on which the tire uniformity is measured (or has been measured), and is output from the tire testing apparatus 1. The operation data includes information indicating the type (characteristic value) of the tire 8 and information acquired during measurement of the tire uniformity. For example, as the information indicating the type which is the characteristic value of the tire 8, there are parameters such as the brand and usage of the tire 8, the tire diameter and the tire width (hereinafter referred to as tire parameters). The information acquired during the measurement of the tire uniformity includes a pressing position, a pressing load at the pressing position (a pressing load measured by the load measuring unit of the rotary drum 2) and the like.

Hereinafter, with reference to FIG. 3, the load estimation model generating unit 130, which is a characteristic configuration of the control device 100, will be described.

The load estimation model generating unit 130 includes a nominal model DB 131, a model selection unit 132, and a nominal model unit 133. The nominal model DB 131 is a database that stores information for generating a load estimation model, which is a nominal model, as nominal model data for each type of the tire 8. The model selection unit 132 switches and selects the nominal model data stored in the nominal model DB 131, depending on the type of the tire 8 in which the tire uniformity is measured by the tire testing apparatus 1. In the nominal model unit 133, a load estimation model which is a nominal model is generated, using the nominal model data selected by the model selection unit 132.

The nominal model DB 131 is a database that stores and accumulates the past operating results of the tire testing apparatus 1 as nominal model data for each type of the tire 8. For example, the nominal model DB 131 stores and accumulates operation data (pressing position, pressing load at the pressing position, etc.) acquired during the measurement of the tire uniformity and stored in the operation DB 110 for each type of the tire 8.

With regard to the type of the tire 8, for example, the tires 8 having the same tire parameters (for example, the tire diameter or the tire width) can be divided (classified) as the same type. The tire 8 having the same combination of the tire parameter value and the brand and usage of the tire 8 may be recognized as the same type.

Specifically, referring to FIG. 3, the nominal model DB 131 stores databases of tires A to X as types of the tire 8. For example, in FIG. 3, the tires A to X may be classified based only on the tire diameter, or may be classified based only on the tire width. Further, the tires A to X may be classified based on a combination of the tire diameter and the tire width, and the tires may be classified based on the combination of the tire diameter, the tire width and the brand. In the present embodiment, it is assumed that the types (tires A to X) of the tire 8 are classified based on a combination of the tire diameter and the tire width.

The model selection unit 132 acquires information indicating the type of the tire 8 among the information stored in the operation DB 110 from the operation DB 110 to specify the type of the tire 8, and also selects the nominal model data of the type corresponding to the type of the specified tire 8. For example, the model selection unit 132 acquires the tire diameter and the tire width of the tire 8 from the operation DB 110, and selects the nominal model data of types (tires A to X) corresponding to the combination of the acquired tire diameter and the tire width, and outputs the nominal model data to the nominal model unit 133 to be described later.

The nominal model unit 133 acquires the nominal model data output from the model selection unit 132, and generates a load estimation model for the tire 8 as a nominal model based on the acquired nominal model data. In the present embodiment, a load estimation formula is exemplified as a load estimation model.

As described above, the nominal model data acquired from the model selection unit 132 includes operation data (for example, pressing position or pressing load at the pressing position) acquired during measurement of tire uniformity. For example, the nominal model unit 133 generates a distribution of the pressing load with respect to the pressing position, using this operation data, and acquires the coefficient parameters $a_{ij}$ and $a_{0j}$ of the regression formula illustrated in the following formula (1) in the generated distribution.

$$\hat{F}_j(x) = \sum_{i=1}^{|I|} a_{ij} \cdot x_i + a_{0j} \qquad \text{[Formula 1]}$$

$\hat{F}_j(x)$: pressing load estimation value to tire type j of nominal model $a_{ij}$, $a_{0j}$: coefficient parameter of description variable i concerning tire type j of nominal model j: subscript of tire type in nominal model DB x: description variable vector*description variable is generated by pre-processing operation data $i \in I$: subscript of description variable As described above, the formula (1) in which the coefficient parameters $a_{ij}$ and $a_{0j}$ are determined based on the nominal model data is the nominal model. With this nominal model, with respect to the tire 8 on which the tire uniformity measurement is performed in the tire testing apparatus 1, the pressing load (corresponding to left side of formula (1)) generated in the tire 8 by the pressing position (corresponding to the variable x in the formula (1)) of the rotary drum 2 can be estimated as the load estimation value.

By using the nominal model which is a load estimation formula of the tire 8, a pressing position of the rotary drum 2 corresponding to the target pressing load is calculated as a target pressing position, and the calculated target pressing position is output to a successive estimation model unit 120 to be described later.

The above is a description of the load estimation model generating unit 130.

The successive estimation model unit 120 acquires the target pressing position output by the nominal model unit 133 of the load estimation model generating unit 130. Then, the successive estimation model unit 120 instructs the rotary drum 2 to be pressed against the tire 8 at the acquired target pressing position. Thereafter, the successive estimation model unit 120 acquires the pressing position and the pressing load measured by the load measuring unit of the rotary drum 2 from the operation data that is output from the tire testing apparatus 1 and stored in the operation DB 110, and sequentially calculates the pressing position of the rotary drum 2 so that the acquired pressing load becomes the target pressing load, and outputs the pressing position to the tire testing apparatus 1.

From the above explanation, before the successive estimation model unit 120 sequentially calculates the pressing position of the rotary drum 2, the load estimation model generating unit 130 uses the nominal model to calculate the pressing position (target pressing position) that achieves the target pressing load in the tire 8, and provides the calculated target pressing position to the successive estimation model unit 120. As a result, the successive estimation model unit 120 can start the sequential calculation of the pressing position from the pressing position at which the target pressing load can be achieved with a high probability.

Therefore, by being controlled by the control device 100 including the load estimation model generating unit 130, the tire testing apparatus 1 can apply the target pressing load to the tire 8 in a very short time from the start of the measurement of the tire uniformity of the tire 8. In this way, if the target pressing load can be applied to the tire 8 in a short time, the start of measuring the tire uniformity can be shortened, and it is possible to improve the operation efficiency and the productivity of the tire testing apparatus 1.

Here, the method for sequential calculation of the pressing position by the successive estimation model unit 120 will be exemplified below.

The successive estimation model unit 120 sequentially measures the tire load, while changing the pressing position of the rotary drum 2 with respect to the tire T. The successive estimation model unit 120 weights the measured value of the successively measured tire load to increase the weight as the measured value approaches the target value of the tire load, and estimates the load model representing the relation between the pressing position and the pressing load, using the spring constant, based on the weighted measured value. As a load model, the load model is estimated, by adopting a linear formula in which the pressing position of the rotary drum 2 and the pressing load applied to the tire 8 linearly change, and by fitting a linear formula with respect to the weighted measured value to acquire the spring constant from the slope of the linear formula after fitting.

In other words, the load model adopted by the successive estimation model unit 120 does not consider that linearity is established for all data at the pressing position over a wide range, but mainly considers linearity at some pressing positions that achieves a value in the vicinity of the target pressing load on the tire 8. As described above, the successive estimation model unit 120 can also accurately achieve the pressing load to be applied to the tire 8, by preferentially using the measured value in the vicinity of the "target pressing load" such that a linear relation with the tire load is established.

Specifically, the successive estimation model unit 120 processes the measured value of the pressing load measured by the above-described load measuring means with a predetermined weighting characteristic function to perform "weighting", and acquires (acquires the above-mentioned linear formula) the spring constant, by preferentially using the measurement data in a range such that a linear relation is established between the pressing position of the rotary drum 2 and the pressing load applied to the tire 8.

Here, the weighting characteristic function is a function in which the maximum weight $W_{max}$ is acquired when the tire load measured by the load measuring unit is the "target pressing load", and "weighting" abruptly decreases and becomes zero when the tire load deviates from the "target pressing load". Therefore, if the measured value of the pressing load measured by the load measuring unit is processed with the above-mentioned weighting characteristic function, it is possible to acquire a linear formula preferentially using the measured value located in the vicinity of the "target pressing load".

Next, by describing the operation of the control device 100 and the control method of the tire testing apparatus 1 with reference to FIGS. 3 to 4, a method for generating a load estimation model according to this embodiment will be described.

Figure 4:
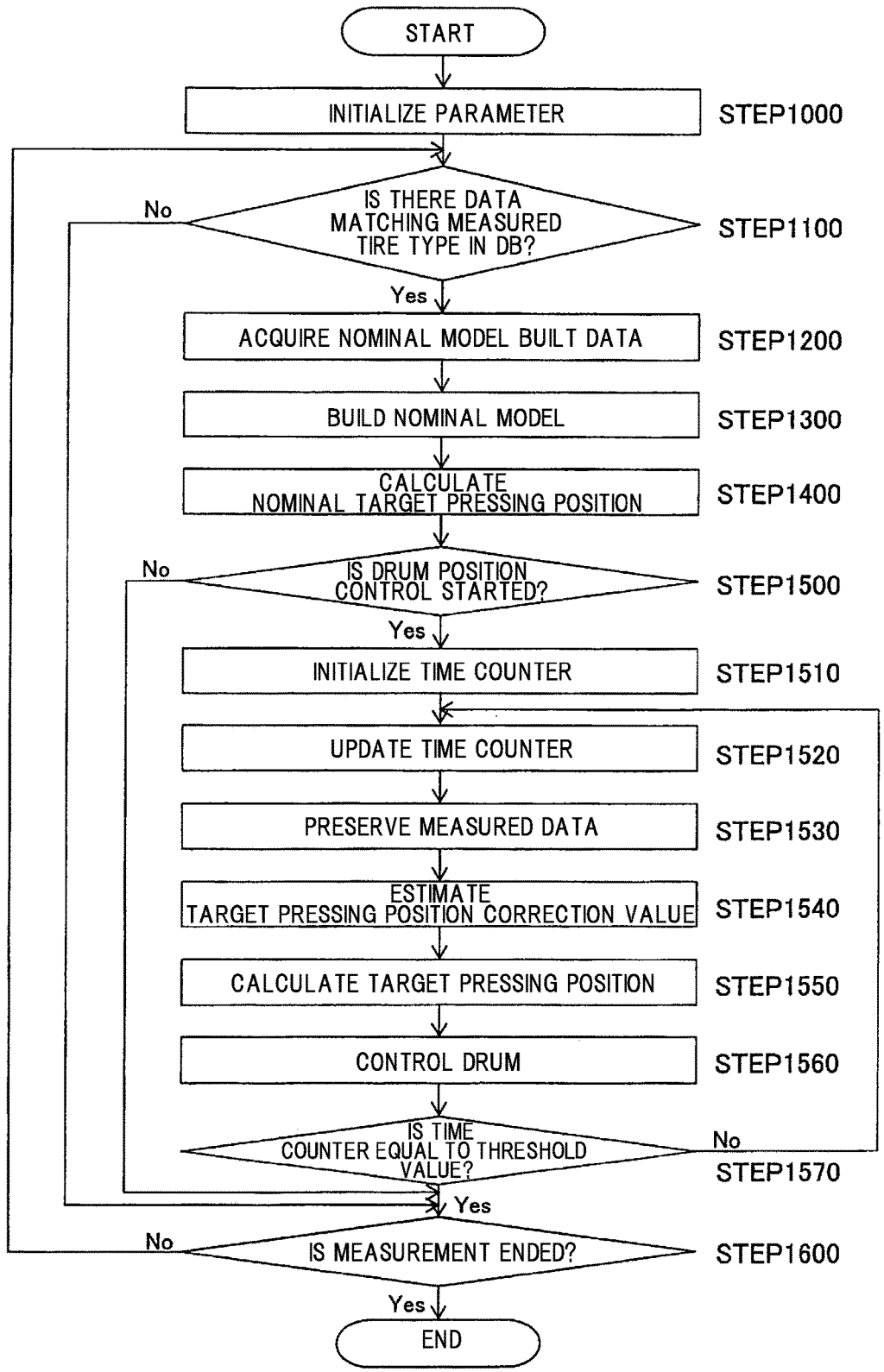
FIG. 4 is a flowchart illustrating a processing procedure of a method for generating the load model according to the first embodiment.

FIG. 4 is a flowchart illustrating a processing procedure of the method for generating the load model according to the present embodiment.

First, in the tire testing apparatus 1, when measurement of the tire uniformity of the tire 8 is started, various parameters calculated in the past (in the previous measurement) in the tire testing apparatus 1 and the control device 100 are initialized (STEP 1000).

The control device 100 acquires the type of the tire 8 as the measurement object of the tire uniformity from the tire testing apparatus 1, and stores the type in the operation DB 110.

The model selection unit 132 acquires the tire diameter and the tire width of the tire 8 from the operation DB 110 as the type of the tire 8, and searches the nominal model data of the type (tire A to tire X) corresponding to the acquired combination of the tire diameter and the tire width (STEP 1100).

Here, prior to initialization of parameters in STEP 1000, with respect to the tire in which tire uniformity has already been measured in the tire testing apparatus 1, the information acquired in the measurement is held as nominal model data for each type (characteristic value) of the tire (holding step).

If there is nominal model data corresponding to the type of the tire 8, the model selection unit 132 outputs the nominal model data to the nominal model unit 133. The nominal model unit 133 acquires the output nominal model data as data for generating (building) a nominal model.

That is, the model selection unit 132 acquires a nominal model used for generating the load estimation model (load estimation formula) from the information (nominal model data) held in the holding step, depending on the type (characteristic value) of the tire 8 (an acquiring step, STEP 1200).

The nominal model unit 133 acquires the coefficient parameters $a_{ij}$ and $a_{0j}$ of the regression formula illustrated in the above formula (1) based on the nominal model data acquired from the model selection unit 132, and generates (builds) the nominal model (load estimation formula). That is, based on the acquired nominal model data, a load estimation formula expressing the relation between the pressing position on the tire 8 and the pressing load applied to the tire 8 is generated as a nominal model (generating step, STEP 1300).

The nominal model unit 133 calculates the pressing position of the rotary drum 2 corresponding to the target pressing load of the tire 8, as the target pressing position (nominal target pressing position) provided by the nominal model, using the built nominal model, and outputs the pressing position acquired by this calculation to the successive estimation model unit 120 (STEP 1400).

The successive estimation model unit 120 acquires the pressing position that is output from the nominal model unit 133 of the load estimation model generating unit 130, and starts the controlling of the pressing position of the rotary drum 2 from the acquired pressing position (STEP 1500).

When the rotary drum 2 moves to the pressing position output from the nominal model unit 133 and the pressing load applied to the tire 8 is measured, the data of the pressing load and the measured value (the pressing load and the pressing position) of the pressing position of the rotary drum 2 are output to the operation DB 110 of the control device 100, and are stored in the operation DB 110 as measured values for the tire 8.

The data of the measured value (pressing load and pressing position) stored in the operation DB 110 are output to the successive estimation model unit 120.

The successive estimation model unit 120 appropriately performs "initialization of the time counter (STEP 1510)", "update of the time counter (STEP 1520)", "preservation of the measurement data (STEP 1530)" and the like as needed Subsequently, the successive estimation model unit 120 performs the above-described weighting on the measured value of the pressing load, based on the pressing position of the rotary drum 2 that is output from the operation DB 110.

Specifically, the weighting function stored in the control device in advance is applied to the pressing load that is the measured value which is output from the operation DB 110. Weighting based on whether or not the pressing position of the rotary drum 2 is located in the vicinity of the "target pressing load" is applied to the pressing load, by this weighting function. When the pressing position is a value close to the "target pressing load", large weighting is given, and when the pressing position is a value far from the "target pressing load", weighting close to zero is given.

The successive estimation model unit 120 estimates the load model, using the measured value (pressing load) of the tire load weighted in this way. Based on the estimated load model, the successive estimation model unit 120 estimates a correction value (target pressing position correction value) for the pressing position that is output from the nominal model unit 133 in STEP 1400 (STEP 1540).

Specifically, the successive estimation model unit 120 calculates a "spring constant" as the proportional constant and estimates the load model, on the assumption that linearity is established between the measured value of the weighted pressing load and the pressing position of the rotary drum 2. The "spring constant" calculated in this way is calculated using mainly the measured value in the vicinity of the "target pressing load", and can accurately estimate the pressing load by this estimated load model.

The successive estimation model unit 120 adds the correction value (target pressing position correction value) estimated in STEP 1540 to the pressing position that is output from the nominal model unit 133 in STEP 1400, and corrects (calculates) the target pressing position of the rotary drum 2 (STEP 1550).

The target pressing position of the rotary drum 2 calculated and corrected by the successive estimation model unit 120 is output to the tire testing apparatus 1. The tire testing apparatus 1 controls the pressing position of the rotary drum 2 in accordance with the output target pressing position (STEP 1560).

The successive estimation model unit 120 repeats the aforementioned series of processes of STEP 1500 to STEP 1560 until the time counter reaches a predetermined time (STEP 1570).

In this way, by repeating the processes from STEP 1500 to STEP 1560, which are started using the target pressing position (nominal target pressing position) calculated in STEP 1400, it is possible to accurately and sequentially control the pressing position of the rotary drum 2.

That is, if the series of calculations of STEP 1500 to STEP 1570 are performed in accordance with the operation of pressing the rotary drum 2 toward the tire 8, in STEP 1100 to STEP 1400, the nominal model of the tire 8 as the measurement object of the tire uniformity can be built, and the target pressing position for the target pressing load can be acquired. When using this target pressing position, because the control of the pressing position of the rotary drum 2 can be started from a pressing position at which the target pressing load is substantially achieved, the position of the rotary drum 2 can be accurately controlled, using a plurality of measurement data, and it is also possible to accurately measure the tire uniformity of the tire 8 in a short time.

Second Embodiment

Hereinafter, a second embodiment of the present invention will be described with reference to the drawings.

In the present embodiment, as in the first embodiment, a method for generating a "load estimation model" used in the tire uniformity testing apparatus 1 exemplified in FIGS. 1 and 2 will be described. In particular, a configuration of a control device 200 illustrated in FIG. 5 will be described.

In the control device 200 according to the present embodiment, even when the nominal model data corresponding to the type of the tire 8 whose tire uniformity is measured by the tire testing apparatus 1 is not stored in the nominal model DB 131, it is possible to generate the "load estimation model" explained in the first embodiment.

Figure 5:
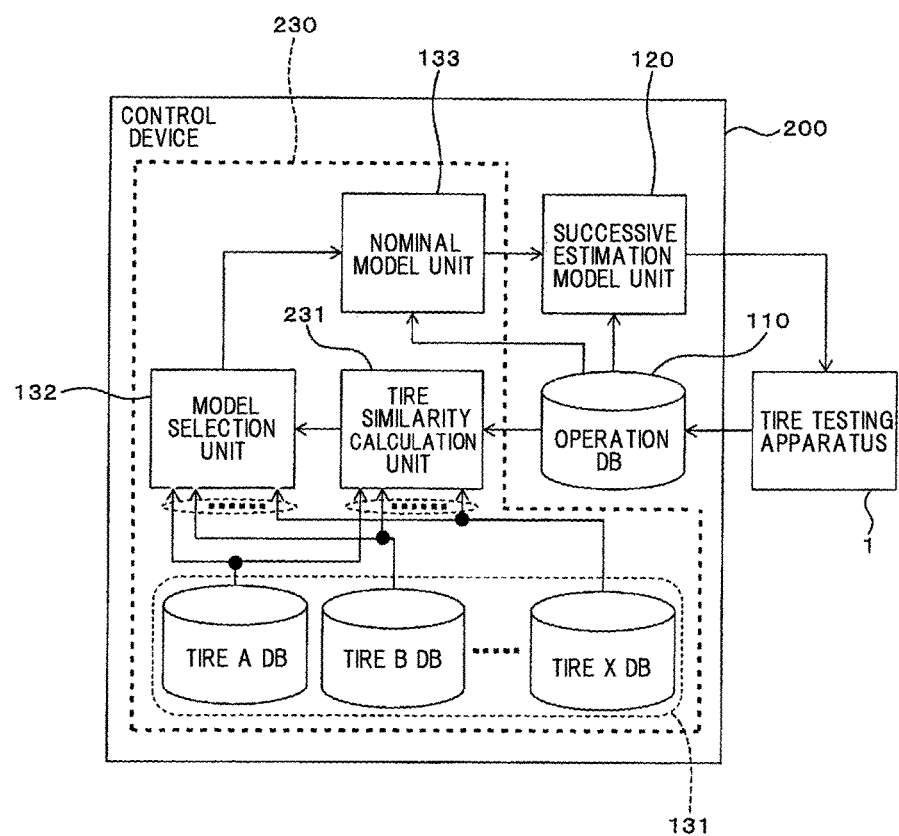
FIG. 5 is a block diagram illustrating a configuration of a control device connected to a tire uniformity testing apparatus according to a second embodiment to generate a load estimation model.

FIG. 5 is a block diagram illustrating the configuration of the control device 200 connected to the tire testing apparatus 1 according to the present embodiment to generate a load model. The control device 200 is provided in the tire testing apparatus 1 to accurately achieve the target pressing load, and controls the pressing position of the rotary drum 2.

The control device 200 includes an operation DB 110, a successive estimation model unit 120, and a load estimation model generating unit 230. The operation DB 110 and the successive estimation model unit 120 have the same configurations as those of the operation DB 110 and the successive estimation model unit 120 described in the first embodiment.

The load estimation model generating unit 230 includes a nominal model DB 131, a model selection unit 132, a nominal model unit 133, and a tire similarity calculation unit 231. The nominal model DB 131, the model selection unit 132 and the nominal model unit 133 have the same configurations as those of the nominal model DB 131, the model selection unit 132 and the nominal model unit 133 described in the first embodiment.

That is, the control device 200 is characterized by including the tire similarity calculation unit 231. Therefore, the configuration of the tire similarity calculation unit 231 will be described below.

The tire similarity calculation unit 231 acquires information indicating the type of the tire 8 among the information stored in the operation DB 110 from the operation DB 110, and specifies the type of the tire 8 as the measurement object. Along with this, the tire similarity calculation unit 231 searches the type of nominal model data corresponding to the identified type of the tire 8 in the nominal model DB 131, and when the target nominal model data does not exist, the tire similarity calculation unit 231 acquires the type with the highest similarity to the type of the tire 8. Specifically, the tire similarity calculation unit 231 calculates and acquires type with the highest similarity to the type (characteristic value) of the tire 8 as the measurement object, among the types (characteristic values) of the tire in which the nominal model data is stored in the nominal model DB 131.

This similarity is evaluated, on the basis of the distance on a parameter space acquired using the following formula (2), for example, in a parameter space of a tire parameter (tire diameter and tire width) for determining the type (characteristic value) of the tire.

$$d_{nj} = \sqrt{\sum_{k=1}^{|K|} (y_{nk}^* - z_{jk}^*)^2} \qquad \text{[Formula 2]}$$

$d_{nj}$: distance on tire parameter space of tire type j in nominal database DB and measured tire type n $y_{nk}^*$: standardized value of tire parameter variable k of measured tire type n $z_{jk}^*$: standardized value of tire parameter variable k of tire type j in nominal model DB n: subscript of measured tire type j: subscript of tire type in nominal model DB K: assemble of dimension of tire parameter space k: subscript of dimension of tire parameter space The tire similarity calculation unit 231 calculates the distance in the parameter space between the type (characteristic value) of the tire 8 as the measurement object and all the types (characteristic values) of the tires stored in the nominal model DB 131 by the above formula (2).

The standardized value for the tire type n of the tire 8 as the measurement object in the formula (2) is acquired by the following formula (3), and the standardized value for the tire type j in the nominal model DB 131 is acquired by the following formula (4).

$$y_{nk}^* = \frac{y_{nk} - \rho_k}{\sigma_k} \qquad \text{[Formula 3]}$$

$y_{nk}^*$: standardized value of tire parameter variable k of measured tire type n $y_{nk}$: value of tire parameter variable k of measured tire type n $\rho_k$: nominal model DB for tire parameter variable k, average of data values of measurement tire $\sigma_k$: nominal model DB for tire parameter variable k, standard deviation of data values of measurement tire n: subscript of measured tire type k: subscript of dimension of tire parameter space $$z_{jk}^* = \frac{z_{jk} - \rho_k}{\sigma_k} \quad \text{[Formula 4]}$$

$z_{jk}^*$: standardized value of tire parameter variable k of tire type j in nominal model DB $z_{jk}$: value of tire parameter variable k of measured tire type j in nominal model DB $\rho_k$: nominal model DB for tire parameter variable k, average of data values of measurement tire $\sigma_k$: nominal model DB for tire parameter variable k, standard deviation of data values of measurement tire j: subscript of tire type in nominal model DB k: subscript of dimension of tire parameter space The average ρ and the standard deviation σ in the formulas (3) and (4) are acquired by the following formulas (5) and (6).

$$\rho_k = \frac{1}{|J|+1}\left( y_{nk} + \sum_{j=1}^{|J|} z_{jk} \right) \quad \text{[Formula 5]}$$

$\rho_k$: nominal model DB for tire parameter variable k, average of data values of measurement tire J: assemble of tire type in nominal model DB $y_{nk}$: value of tire parameter variable k of measured tire type n $z_{jk}$: value of tire parameter variable k of tire type j in nominal model DB k: subscript of dimension of tire parameter space n: subscript of measured tire type j: subscript of tire type in nominal model DB $$\sigma_k = \sqrt{\frac{1}{|J|+1}\left\{ (\rho_k - y_{nk})^2 + \sum_{j=1}^{|J|} (\rho_k - z_{jk})^2 \right\}} \quad \text{[Formula 6]}$$

Figure 6:
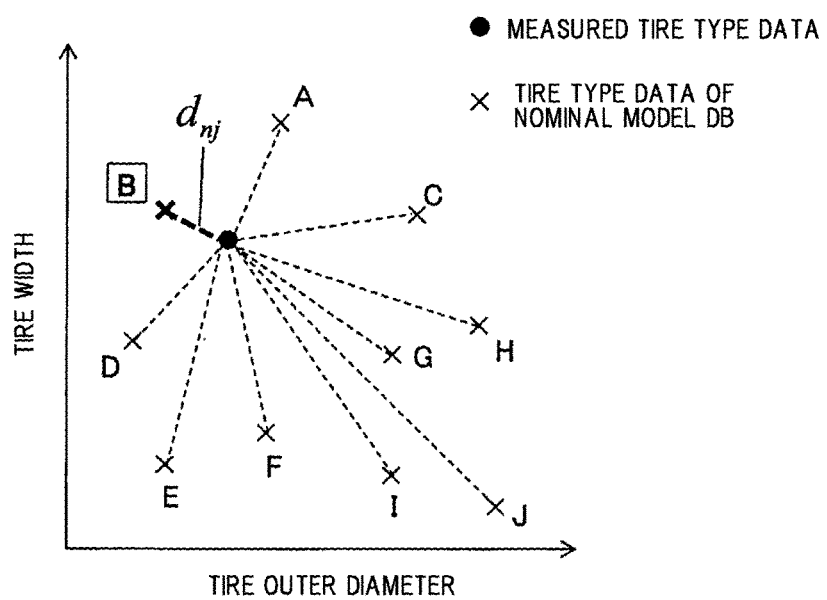
FIG. 6 is an explanatory view that schematically illustrates a distance from the type of a tire in a nominal model DB in a parameter space, with respect to the type of a tire to be measured.

$\sigma_k$: nominal model DB for tire parameter variable k, standard deviation of data values of measurement tire J: assemble of tire type in nominal model DB $\rho_k$: nominal model DB for tire parameter variable k, average of data values of measurement tire $y_{nk}$: value of tire parameter variable k of measured tire type n $z_{jk}$: value of tire parameter variable k of tire type j in nominal model DB k: subscript of dimension of tire parameter space n: subscript of measured tire type j: subscript of tire type in nominal model DB When the tire similarity calculation unit 231 acquires the distance between the type (characteristic value) of the tire 8 as the measurement object and all the types (characteristic values) of the tire in the nominal model DB 131 by the formula (2) based on the formulas (3) to (6), for example, the result illustrated in FIG. 6 is acquired. FIG. 6 is an explanatory view schematically illustrating the distance from the type of the tire of the nominal model DB in the parameter space, with respect to the type of the tire 8 as the measurement object.

In FIG. 6, in the parameter space based on the tire diameter (outer diameter) and tire width which are two tire parameters, the position of the tire 8 (measured tire) as the measurement object, and the positions of the ten tires (tires A to J) of the nominal model data are illustrated. In FIG. 6, the tire similarity calculation unit 231 calculates the distance from the tire 8 to the tires A to J, using the above formula (2), determines and acquires the type of tire of the nominal model data at the shortest distance from the tire 8 among the distances acquired by this calculation, based on the following formula (7).

$$dID_n = \arg\min_{j \in J} d_{nj} \quad \text{[Formula 7]}$$

$dID_n$: tire type ID of nominal model DB selected for measured tire type n $d_{nj}$: tire type j of nominal model DB and distance on tire parameter space of measured tire type n n: subscript of measured tire type j: subscript of tire type in nominal model DB J: assemble of tire type in nominal model DB FIG. 6 illustrates that the nominal model data located at the shortest distance from the tire 8 is the data of the tire B. The tire similarity calculation unit 231 determines that the type of the tire B at the shortest distance has the highest similarity to the type of the tire 8, and outputs the result of this determination to the model selection unit 132.

Next, with reference to FIG. 5 and FIG. 7, by explaining the operation of the control device 200 including the above-described tire similarity calculation unit 231 and the control method for the tire testing apparatus 1, the method for generating the load estimation model will be described.

Figure 7:
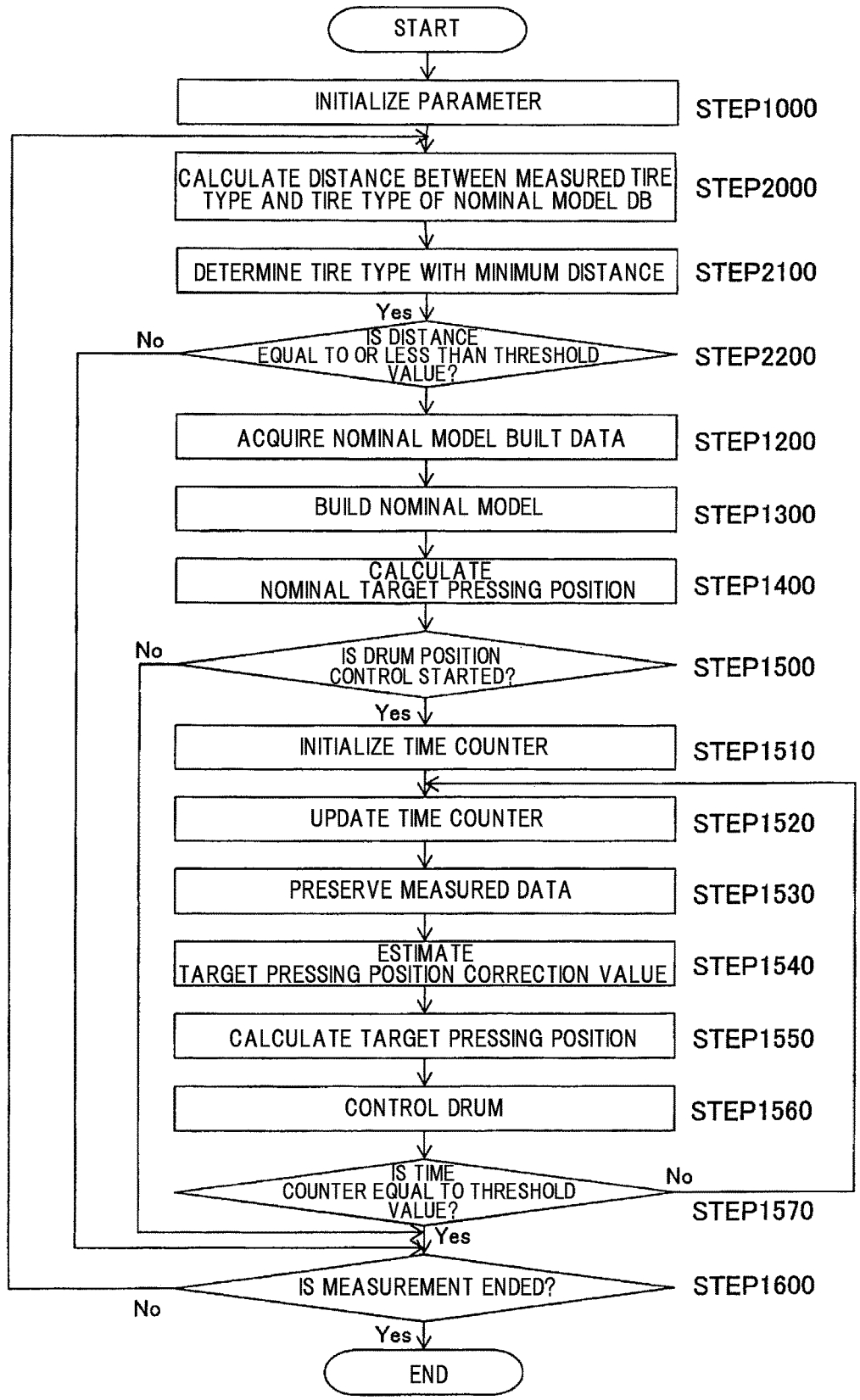
FIG. 7 is a flowchart illustrating a processing procedure of a method for generating the load estimation model according to the second embodiment.

FIG. 7 is a flowchart that illustrates a processing procedure of a method for generating the load model according to the present embodiment. In the flowchart illustrated in FIG. 7, the same process as the flowchart of FIG. 4 described in the first embodiment is denoted by the same step (STEP) number. In other words, STEP 1000 and STEP 1200 to STEP 1600 are the same processes as in the first embodiment, and in the present embodiment, processes in STEP 2000 to STEP 2200 performed by the tire similarity calculation unit 231 are characterized. Therefore, in the following description, only the processes of STEP 2000 to STEP 2200 will be described.

When initialization of the parameter in STEP 1000 is completed, the tire similarity calculation unit 231 calculates the distance on the parameter space of the type (characteristic value) of the tire 8 as the measurement object and the all types (characteristic values) of the tire stored in the nominal model DB 131, using the above-described formula (2) (STEP 2000).

Based on the distance calculated in STEP 2000, the tire similarity calculation unit 231 determines and acquires the type of tire of the nominal model data at the shortest distance from the tire 8 using formula (7) (STEP 2100).

The tire similarity calculation unit 231 determines whether or not the type of the tire of the nominal model data at the shortest distance is equal to or less than a predetermined distance from the type of the tire 8 as the measurement object. That is, the tire similarity calculation unit 231 determines whether or not the distance from the type of the tire 8 as the measurement object to the type of the tire at the shortest distance is equal to or less than the threshold value, and if the distance is equal to or less than the threshold value, the tire similarity calculation unit 231 outputs the type of a certain tire at the shortest distance to the model selection unit 132 (STEP 2200).

The model selection unit 132 acquires the type of tire that is located at the shortest distance output from the tire similarity calculation unit 231. The model selection unit 132 outputs the nominal model data of the acquired tire type to the nominal model unit 133. The nominal model unit 133 acquires the output nominal model data as data for generating (building) a nominal model. That is, by using the information held in the holding step, the nominal model data used for generating the nominal model which is the load estimation formula (load estimation model) is acquired depending on the tire characteristic value of another tire having the highest similarity with respect to the tire 8 (acquiring step, STEP 1200).

Hereinafter, STEP 1300 to STEP 1600 described in the first embodiment are performed.

When the tire testing apparatus 1 is operated by such a control device 200, even if the nominal model data of a type corresponding to the type of the tire 8 as the measurement object does not exist, it is possible to build the nominal model of the tire 8 and acquire the target pressing position with respect to the target pressing load. When using this target pressing position, similarly to the first embodiment, the control of the pressing position of the rotary drum 2 can be started from a pressing position at which the target pressing load is substantially achieved. This makes it possible to precisely control the position of the rotary drum 2 using a plurality of measurement data and accurately measure the tire uniformity of the tire 8 in a short time.

Third Embodiment

Hereinafter, a third embodiment of the present invention will be described with reference to the drawings.

In the present embodiment, as in the first embodiment, a method for generating a "load estimation model" used in the tire uniformity testing apparatus 1 exemplified in FIGS. 1 and 2 will be described. In particular, however, a configuration of a control device 300 illustrated in FIG. 8 will be described.

In the control device 300 according to the present embodiment, even when the nominal model data corresponding to the type of the tire 8 in which the tire uniformity is measured by the tire testing apparatus 1 is not stored in the nominal model DB 131, it is possible to generate the "load estimation model" explained in the first embodiment.

Figure 8:
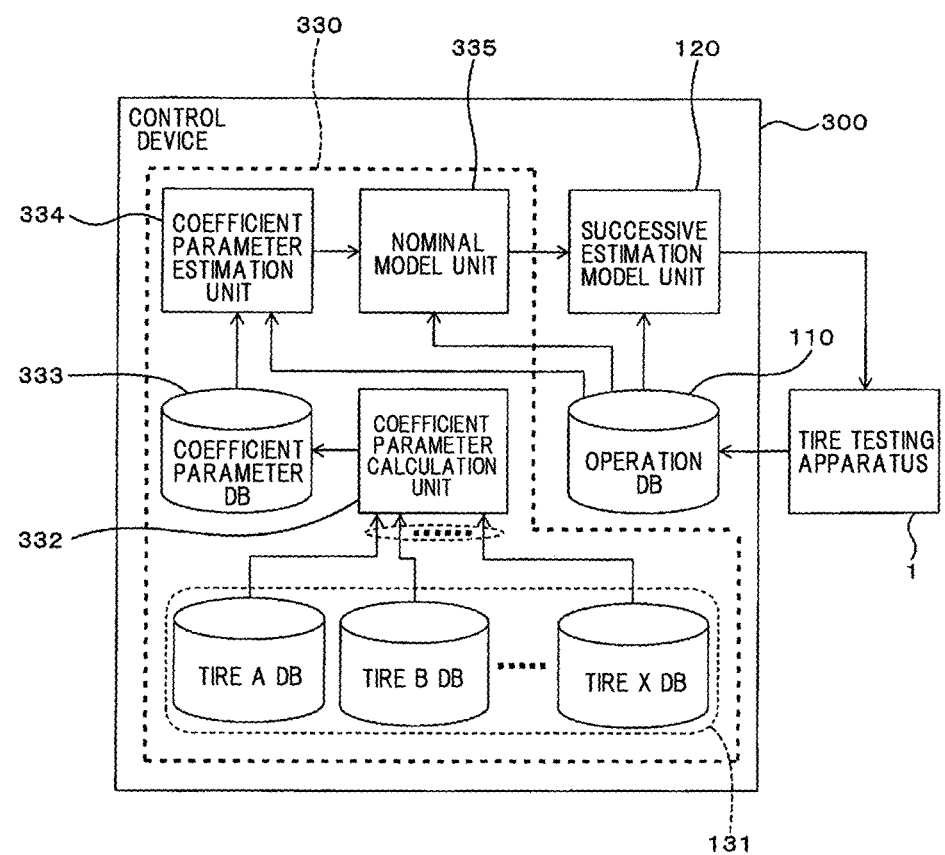
FIG. 8 is a block diagram illustrating a configuration of a control device connected to a tire uniformity testing apparatus according to a third embodiment to generate a load estimation model.

FIG. 8 is a block diagram illustrating the configuration of the control device 300 connected to the tire testing apparatus 1 according to this embodiment to generate a load model. The control device 300 is provided in the tire testing apparatus 1 in order to accurately achieve the target pressing load, and controls the pressing position of the rotary drum 2.

The control device 300 includes an operation DB 110, a successive estimation model unit 120, and a load estimation model generating unit 330. The operation DB 110 and the successive estimation model unit 120 have the same configuration as those of the operation DB 110 and the successive estimation model unit 120 described in the first embodiment.

The load estimation model generating unit 330 includes a nominal model DB 131, a coefficient parameter calculation unit 332, a coefficient parameter database (DB) 333, a coefficient parameter estimation unit 334, and a nominal model unit 335. The nominal model DB 131 has the same configuration as that of the nominal model DB 131 described in the first embodiment.

The coefficient parameter calculation unit 332, the coefficient parameter database (DB) 333, the coefficient parameter estimation unit 334, and the nominal model unit 335, which are characteristic configurations of the control device 300, will be described below. The coefficient parameter calculation unit 332, the coefficient parameter database (DB) 333, the coefficient parameter estimation unit 334, and the nominal model unit 335, which will be described below, obtain the following formula (8) to be described later as a load estimation formula that is a load estimation model (nominal model).

$$\hat{F}_n(x, y_n) = \sum_{i=1}^{|I|} (\hat{a}_{ni}(y_n) \cdot x_i) + \hat{a}_{n0}(y_n) \quad \text{[Formula 8]}$$

$\hat{F}_n(x, y_n)$: pressing load estimation value to measured tire type n

The nominal model represented by this formula (8) is finally acquired by the nominal model unit 335, but the nominal model unit 335 generates the nominal model, using the coefficient parameter estimation value which is obtained by the following formula (9) in the coefficient parameter estimation unit 334.

$$\hat{a}_{ni}(y_n) = \sum_{k=1}^{|K|} b_{ik} \cdot y_{nk} + b_{i0} \quad \text{[Formula 9]}$$

$\hat{a}_{ni}(y_n)$: coefficient parameter estimation value of description variable i of nominal model to measured tire type n $y_n$: tire parameter vector to measured tire type n The coefficient parameter calculation unit 332 to be described next acquires a multiple regression coefficient vector used as a coefficient in formula (9) for acquiring the coefficient parameter estimated value.

The coefficient parameter calculation unit 332 acquires the multiple regression coefficient vector $b_i$ according to the following formulas (10) and (11) for each nominal model data stored in the nominal model DB 131, using the nominal model data. In this embodiment, the multiple regression coefficient vector $b_i$ is acquired for each nominal model data and for each type of tire parameter (that is, tire diameter and tire width).

$$A_i = Z \cdot b_i \quad \text{[Formula 10]}$$

$$b_i = (Z^T Z)^{-1} Z^T A_i \quad \text{[Formula 11]}$$

$$b_i \begin{bmatrix} b_{i0} \\ \vdots \\ b_{ik} \end{bmatrix}:$$

multiple regression coefficient vector of coefficient parameter estimation formula of description variable i of nominal model (column K first row)

$$A_i \begin{bmatrix} a_{i0} \\ \vdots \\ a_{iJ} \end{bmatrix}:$$

coefficient parameter vector of description variable i concerning tire type j in nominal model (column J first row)

$$Z = \begin{bmatrix} Z_{00} & \cdots & Z_{0K} \\ \vdots & \ddots & \vdots \\ Z_{J0} & \cdots & Z_{JK} \end{bmatrix};$$

tire type in nominal model DB—tire parameter variable matrix (column J row K)

Then, the coefficient parameter calculation unit 332 determines the coefficient parameter estimation formula illustrated in the formula (9), using the multiple regression coefficient vector $b_t$ according to the formulas (10) and (11), and calculates the coefficient parameter corresponding to the tire parameter as the characteristic values of the tire 8 or the nominal model data. Thus, for example, when the tire parameter is the tire diameter, the coefficient parameter corresponding to the tire diameter is calculated as the characteristic value of the nominal model data, for each nominal model data. Similarly, even in the case where the tire parameter is the tire width, the coefficient parameter corresponding to the tire width is calculated as the characteristic value of the nominal model data for each nominal model data.

The coefficient parameter DB 333 stores the coefficient parameters acquired by the coefficient parameter calculation unit 332 for each nominal model data. When using the coefficient parameters stored in the coefficient parameter DB 333, it is possible to obtain the distribution of the coefficient parameters on certain tire parameter, for all the nominal model data stored in the nominal model DB 131, such as the distribution of the coefficient parameters on the tire diameter, or the distribution of the coefficient parameters on the tire width.

The coefficient parameter estimation unit 334 estimates the coefficient parameter for the tire 8 as the measurement object, and outputs the estimated coefficient parameter to the nominal model unit 335.

Figure 9:
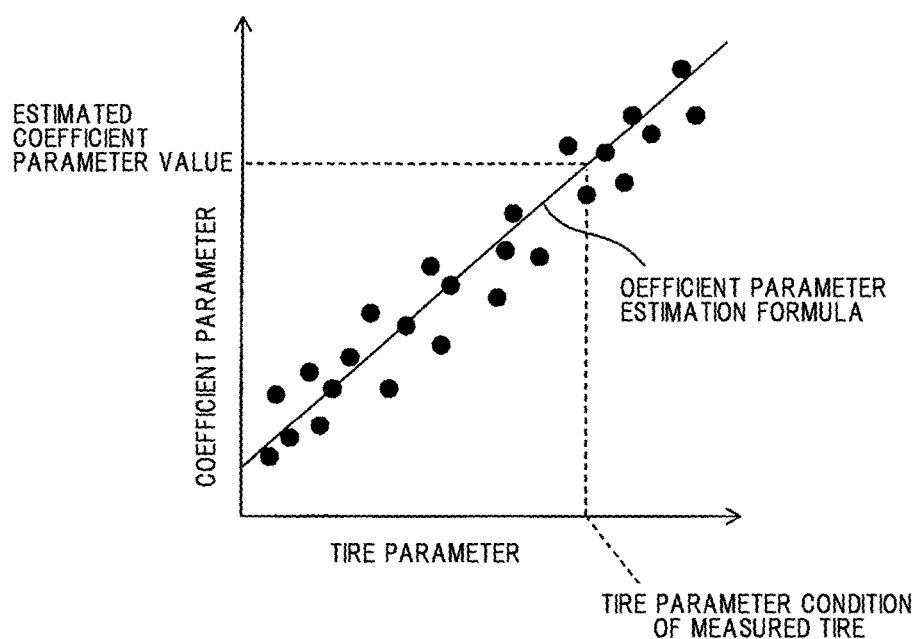
FIG. 9 is an explanatory view illustrating a method for estimating coefficient parameters in a third embodiment.

Specifically, this will be described with reference to FIG. 9. FIG. 9 is an explanatory view illustrating a method for estimating coefficient parameters according to the present embodiment. Each of a plurality of black circles "●" illustrated in FIG. 9 represents a coefficient parameter acquired from the coefficient parameter DB 333, and the distribution of the coefficient parameter is indicated by the plurality of black circles "●".

The coefficient parameter estimation unit 334 acquires information indicating the type of the tire 8 as the measurement object from the operation DB 110, and acquires the distribution of the coefficient parameter regarding the tire parameter from the coefficient parameter DB 333. Then, as illustrated in FIG. 9, the coefficient parameter estimation unit 334 acquires the coefficient parameter estimation formula, by fitting formula (9), using the least squares method or the like by formulas (10) and (11), for the distribution of the acquired coefficient parameters. Further, by applying the value of the tire parameter (the condition of the tire parameter of the measured tire) acquired from the operation DB 110 to the acquired coefficient parameter estimation formula, the coefficient parameter value for the tire 8 as the measurement object is estimated.

The nominal model unit 335 applies the coefficient parameter, which is output from the coefficient parameter estimation unit 334, to the above formula (8) to generate a load estimation formula that is a load estimation model (nominal model). The pressing position of the rotary drum 2 corresponding to the target pressing load is calculated as the target pressing position, using the nominal model which is the load estimation formula for the tire 8, and the calculated target pressing position is output to the successive estimation model unit 120.

Next, by illustrating the operation of the above-described control device 300 and the control method for the tire testing apparatus 1 with reference to FIG. 8 and FIG. 10, the method for generating the load estimation model according to this embodiment will be described.

Figure 10:
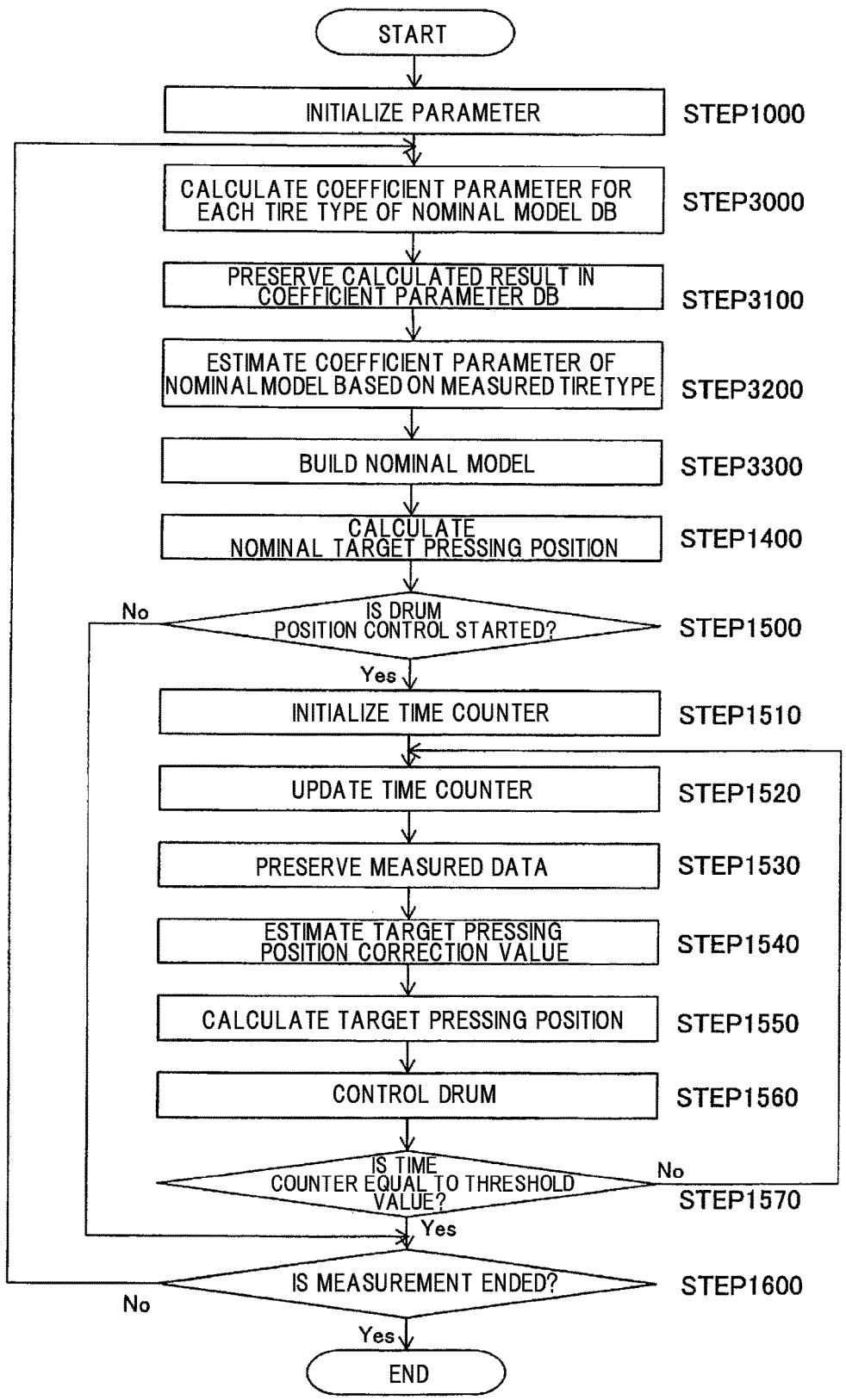
FIG. 10 is a flowchart illustrating a processing procedure of a method for generating the load estimation model according to the third embodiment.

FIG. 10 is a flowchart that is a processing procedure of the method for generating the load model according to the present embodiment. In the flowchart illustrated in FIG. 10, the same processes as those of the flowchart of FIG. 4 described in the first embodiment numbers are denoted by the same steps (STEP). That is, STEP 1000 and STEP 1400 to STEP 1600 are the same processes as in the first embodiment. In this embodiment, the processes of STEP 3000 to STEP 3300 performed by the coefficient parameter calculation unit 332, the coefficient parameter database (DB) 333, and the coefficient parameter estimation unit 334 are characterized. Therefore, in the following description, only the processes of STEP 3000 to STEP 3300 will be described.

Upon completion of initialization of parameters in STEP 1000, the coefficient parameter calculation unit 332 determines the coefficient parameter estimation formula illustrated in the formula (9) using the multiple regression coefficient vector $b_t$ according to the above formulas (10) and (11), and calculates the coefficient parameters corresponding to tire parameters for all nominal model data (STEP 3000).

The coefficient parameter DB 333 stores the coefficient parameter calculated in STEP 3000 using the information held in the holding step prior to STEP 1000 for each nominal model data (STEP 3100).

The coefficient parameter estimation unit 334 obtains a coefficient parameter estimation formula by fitting the formula (9) to the distribution of the coefficient parameter illustrated in FIG. 9 acquired from the coefficient parameter DB 333. Further, the coefficient parameter estimation unit 334 estimates the coefficient parameter value of the tire 8, by applying the value of the tire parameter of the tire 8 as the measurement object to the obtained coefficient parameter estimation formula. The coefficient parameter estimation unit 334 outputs the estimated coefficient parameter value to the nominal model unit 335 (STEP 3200).

The nominal model unit 335 generates (builds) a load estimation formula (nominal model) by applying the coefficient parameter, which is output from the coefficient parameter estimation unit 334, to the above formula (8). As a result, the nominal model unit 335 acquires the nominal model used to generate the load estimation formula, depending on the characteristic value (coefficient parameter) of the tire 8 which is estimated on the basis of the existing characteristic value (coefficient parameter) of the tire (namely, the nominal model data) estimated in STEP 3200 (STEP 3300).

That is, when combined, STEP 3200 and STEP 3300 become an acquiring step in which the nominal model used for generating the load estimation model (load estimation formula) is acquired on the basis of the characteristic value (tire parameter) of the tire 8 as the measurement object in STEP 1000, in accordance with the characteristic value (coefficient parameter) which is estimated from the information (nominal model data) held in the holding step prior to initialization of the parameters.

Hereinafter, STEP 1400 to STEP 1600 described in the first embodiment are performed.

When operating the tire testing apparatus 1 by the control device 300 as described above, even if the nominal model data of a type corresponding to the type of the tire 8 as the measurement object does not exist, it is possible to build a nominal model of the tire 8 based on the tire parameters such as the tire diameter and the tire width and to acquire the target pressing position for the target pressing load.

For example, even in the case where the tire diameter of the tire 8 as the measurement object is 16 inches when there is only nominal model data of a tire diameter of 15 inches or less and 17 inches or more, it is possible to obtain the coefficient parameter estimation formula based on the distribution of the coefficient parameters for the nominal model data of 15 inches or less and 17 inches or more and to estimate the coefficient parameter corresponding to 16 inches. By estimating this coefficient parameter, a nominal model for the 16 inch tire 8 can be built.

Therefore, as in the first embodiment, the method for generating the load estimation model according to the present embodiment can also initiate the control of the pressing position of the rotary drum 2 from a pressing position at which the target pressing load is substantially achieved. Therefore, it is possible to precisely control the position of the rotary drum 2, using a plurality of measurement data, and to more accurately measure the tire uniformity of the tire 8 in a short time.

It should be understood that the embodiments disclosed are examples in all respects and are not restrictive. In particular, in the embodiment disclosed this time, as items that are not explicitly disclosed, such as operating conditions, working conditions, various parameters, dimensions, weights, volumes, etc. of components, etc., values that are easily conceivable by those skilled in the art are adopted, without departing from the scope that is normally practiced by those skilled in the art.

This application is based on Japanese patent application (Japanese Patent Application No. 2014-208108) filed on Oct. 9, 2014, the contents of which are incorporated herein by reference.

DESCRIPTION OF REFERENCE NUMERALS AND SIGNS

1: tire testing apparatus (tire uniformity testing apparatus)
2: rotary drum
4: drum member
8: tire
100, 200, 300: control device
110: operation database (DB)
120: successive estimation model unit
130, 230, 330: load estimation model (nominal model) generating unit
131: nominal model database (DB)
132: model selection unit
133, 335: nominal model unit

The invention claimed is:

1. A method for generating a load estimation model which is used to control a pressing position of a rotary drum, and generates a load estimation model indicating a relation between a pressing position of a tire with respect to the rotary drum and a load applied to the tire, in a tire uniformity testing apparatus which measures uniformity of the tire by measuring the load applied to the tire pressed against the rotary drum, the method comprising:

holding information acquired by the measurement for each diameter and width value or type of the tested tire, with respect to the tire in which uniformity has already been measured by the tire uniformity testing apparatus;

acquiring a nominal model used for generating the load estimation model from the information held in the holding, in accordance with the diameter and width value or type of the tested tire;

generating a load estimation model which indicates a relation between the pressing position of a non-tested tire and the load applied to the tire, on the basis of the acquired nominal model;

calculating a target pressing position of the tire corresponding to a target pressing load of the tire on the basis of the load estimation model;

pressing the rotary drum against the tire at the acquired target pressing position; and sequentially calculating the pressing position of the tire so that the load applied to the tire becomes the target pressing load.

2. The method for generating the load estimation model according to claim 1, wherein the acquiring acquires the nominal model, in accordance with a characteristic value of another tire having the highest similarity with the tire to be tested.

* * * * *